(12) United States Patent
Jardin et al.

(10) Patent No.: US 12,427,435 B2
(45) Date of Patent: Sep. 30, 2025

(54) CONNECTED YO-YO

(71) Applicant: DUNCAN YO-YO GO, LLC., Wilmington, DE (US)

(72) Inventors: Bryan Paul Jardin, Champions Gate, FL (US); Jason C. Sauey, Madison, WI (US); James M. Petras, Euclid, OH (US); Matthew Banach, Gurnee, IL (US); Joe Brian Doran, Round Rock, TX (US); Try Ty, Chicago, IL (US); Michael D. Banach, Ellicott City, MD (US); Richard Philip Zavracky, Reminderville, OH (US)

(73) Assignee: DUNCAN YO-YO GO, LLC, Wilmington, DE (US)

( * ) Notice: Subject to any disclaimer, the term of this patent is extended or adjusted under 35 U.S.C. 154(b) by 572 days.

(21) Appl. No.: 17/364,373

(22) Filed: Jun. 30, 2021

(65) Prior Publication Data
US 2022/0001289 A1   Jan. 6, 2022

Related U.S. Application Data

(60) Provisional application No. 63/046,995, filed on Jul. 1, 2020.

(51) Int. Cl.
| | | |
|---|---|---|
| *A63H 1/30* | (2006.01) | |
| *A63H 1/24* | (2006.01) | |
| *A63H 1/28* | (2006.01) | |
| *G01P 3/36* | (2006.01) | |
| *G01P 3/44* | (2006.01) | |

(Continued)

(52) U.S. Cl.
CPC .................. *A63H 1/30* (2013.01); *A63H 1/24* (2013.01); *A63H 1/28* (2013.01); *G01P 3/36* (2013.01); *G01P 3/44* (2013.01); *G01P 15/18* (2013.01); *H04B 1/02* (2013.01)

(58) Field of Classification Search
CPC ........ A63H 1/00; A63H 1/30; A63H 2200/00; A63H 33/26
See application file for complete search history.

(56) References Cited

U.S. PATENT DOCUMENTS

| | | | | |
|---|---|---|---|---|
| 4,867,727 A | * | 9/1989 | Lanius | ..................... A63H 1/30 362/802 |
| 6,265,984 B1 | | 7/2001 | Molinaroli | |

(Continued)

FOREIGN PATENT DOCUMENTS

| | | |
|---|---|---|
| BE | 1025294 A1 | 1/2019 |
| CN | 104076920 A | 10/2014 |

(Continued)

OTHER PUBLICATIONS

"Skate. (Xbox 360). Controls" Copyright 2007. (Year: 2007).*

(Continued)

*Primary Examiner* — Steven J Hylinski
(74) *Attorney, Agent, or Firm* — McDonald Hopkins LLC

(57) ABSTRACT

A yo-yo has at least one sensor configured to measure a parameter related to movement of the yo-yo, a transmitter configured to transmit the measured parameter to the computing device. A server is configured to determine a trick performed with the yo-yo based on the measured parameter, and to communicate the determination to one or more computing devices of different players.

23 Claims, 7 Drawing Sheets

(51) Int. Cl.
*G01P 15/18* (2013.01)
*H04B 1/02* (2006.01)

(56) References Cited

U.S. PATENT DOCUMENTS

| | | | |
|---|---|---|---|
| 6,287,193 B1 | 9/2001 | Rehkemper | |
| 6,634,922 B1 | 10/2003 | Driscoll et al. | |
| 6,695,670 B1 | 2/2004 | Driscoll et al. | |
| 7,037,169 B2 | 5/2006 | Benedek et al. | |
| 8,137,182 B2* | 3/2012 | Kearns | G07F 17/3213 463/31 |
| 9,257,054 B2 | 2/2016 | Coza et al. | |
| 9,381,444 B2 | 7/2016 | Grossman | |
| 10,150,044 B2 | 12/2018 | Shlomot | |
| 10,413,837 B2 | 9/2019 | Pance | |
| 10,668,396 B2 | 6/2020 | Shlomot | |
| 10,738,792 B2 | 8/2020 | Christ et al. | |
| 2005/0160066 A1* | 7/2005 | Shaw | G09B 19/00 |
| 2009/0004945 A1 | 1/2009 | deLassus | |
| 2011/0124417 A1* | 5/2011 | Baynes | A63F 13/798 463/43 |
| 2011/0304497 A1* | 12/2011 | Molyneux | G01S 13/751 342/42 |
| 2012/0116714 A1* | 5/2012 | Rogel | G01C 23/00 702/150 |
| 2013/0274040 A1* | 10/2013 | Coza | A63B 43/004 473/570 |
| 2014/0278218 A1* | 9/2014 | Chang | G09B 19/0038 702/150 |
| 2015/0375115 A1* | 12/2015 | Bunting | A63F 13/214 463/29 |
| 2016/0045785 A1* | 2/2016 | Tzovanis | H04B 7/26 700/91 |
| 2016/0236102 A1* | 8/2016 | Shlomot | A63H 1/30 |
| 2016/0332060 A1* | 11/2016 | Rogel | H04R 5/033 |
| 2016/0332064 A1 | 11/2016 | Rogel | |
| 2017/0136374 A1* | 5/2017 | Pance | A63H 1/30 |
| 2018/0104584 A1* | 4/2018 | Utsugi | A63F 13/577 |
| 2020/0246712 A1 | 8/2020 | Shlomot | |
| 2021/0187393 A1* | 6/2021 | Huang | A63F 13/50 |

FOREIGN PATENT DOCUMENTS

| | | | | |
|---|---|---|---|---|
| CN | 206081611 U | 4/2017 | | |
| CN | 106693377 A | 5/2017 | | |
| CN | 110384927 A | 10/2019 | | |
| DE | 102010000025 A1 | 7/2011 | | |
| EP | 3107634 A1 | 12/2016 | | |
| JP | 2013221942 A | 10/2013 | | |
| JP | 2017505703 A | 2/2017 | | |
| JP | 2019022709 A | 2/2019 | | |
| WO | 2011053193 A1 | 5/2011 | | |
| WO | WO-2013074939 A2 * | 5/2013 | | A63B 24/0006 |
| WO | WO-2015126739 A1 * | 8/2015 | | A63B 67/16 |

OTHER PUBLICATIONS

"Skate Xbox 360 Gameplay—Downtown (HD)", published Jun. 23, 2011. Source: https://www.youtube.com/watch?v=WLqLxrK2-WO (Year: 2011).*

"Skate Xbox 360 Gameplay—Game of S-K-A-T-E (HD)", published Jun. 23, 2011. Source: https://www.youtube.com/watch?v=0YvbSF_iYHY (Year: 2011).*

"Xboxachievements.com Skate Game info and Screenshot Gallery", Sep. 14, 2007. (Year: 2007).*

Search Report and Written Opinion for International Application No. PCT/US21/39975 mailed Oct. 13, 2021.

Notice of Reasons for Refusal; Japan Application No. 2023-524489 dated Oct. 30, 2023.

Search Report in corresponding Chinese application CN 2021800470344, dated Jan. 8, 2025.

Office action in corresponding Chinese application CN 2021800470344, dated Jan. 9, 2025.

Extended European Search Report in corresponding EP Application No. 21833071.0, dated Jun. 6, 2024.

Japanese Office Action in corresponding JP Application No. 2023-524489, dated Mar. 11, 2024.

Canadian Office action in corresponding CA Application No. 3,184,125, dated May 28, 2024.

Office action in corresponding Korean Patent Application No. 10-2023-7002267, dated Jul. 15, 2024.

* cited by examiner

CONNECTED YO-YO

CROSS-REFERENCE TO RELATED APPLICATIONS

This application claims priority to U.S. Provisional Patent Application No. 63/046,995 filed on Jul. 1, 2020 and entitled "CONNECTED YO-YO", the entirety of which is incorporated herein by reference.

BACKGROUND

Rotatable devices such as yo-yos, diabolos, frisbees, tops, dreidels, and the like provide entertainment to their players through their movement and the ability to perform tricks. FIG. 1 illustrates an example yo-yo 100. The example yo-yo 100 has a body with a two shells 102, 104 connected by an axle 106. Although not shown, a string is wrapped around the axle 106 and used to control the spinning of the yo-yo 100. For example, the yo-yo can be made to wind and unwind at the end of the string, roll up and down the string, and spin around at the end of the string. While spinning, further tricks can be performed by throwing, flipping, and twisting the yo-yo 100 around and onto the string. This entertainment, however, is limited in time and in space to the player and those in proximity with an ability to watch the player.

BRIEF SUMMARY

According to one example of the present disclosure, a system comprises: a first computing device; a first rotatable device wirelessly connected to the first computing device; a server connected to the first computing device via a network, wherein the first rotatable device comprises: at least one sensor configured to measure a parameter related to movement of the first rotatable device; and a transmitter configured to transmit the measured parameter to the first computing device, and wherein the server is configured to determine a trick performed with the first rotatable device based on the measured parameter, and to communicate the determination to the first computing device.

In various embodiments of the above example, the first computing device is further configured to: display a first virtual animation corresponding to the performed trick on a display of the first computing device; the system further comprises a second computing device, wherein the server is further configured to communicate the determination to the second computing device, and the second computing device is configured to display a second virtual animation corresponding to the performed trick on a display of the second computing device; the first computing device is further configured to: display a game animation on a display of the first computing device, and alter the displayed game animation based on the performed trick; the system further comprises: a second computing device, and a second rotatable device wirelessly connected to the second computing device and comprising: at least one sensor configured to measure a parameter related to movement of the second rotatable device, and a transmitter configured to transmit the measured parameter to the second computing device, wherein the server is further connected to the second computing device via the network, and is further configured to: determine a trick performed with the second rotatable device based on the measured parameter of the second rotatable device, score the trick performed with the first rotatable device, score the trick performed with the second rotatable device, and transmit the scores of the tricks performed with the first and second rotatable devices to the first and second computing devices; the at least one sensor comprises a time of flight sensor; the at least one sensor comprises a magnetometer; and/or the first rotatable device is a yo-yo comprising two shells connected by an axle, wherein the at least one sensor and the transmitter are housed in a first of the two shells, and wherein the second shell comprises a protruding ring within the second shell that is coaxial with the axle.

According to another example of the present disclosure, a method comprises: receiving, at a server, a parameter related to movement of a first rotatable device, the parameter being transmitted from a first computing device wirelessly connected to the first rotatable device; determining, at the server, a trick performed with the first rotatable device based on the received parameter; and communicating the determination to the first computing device.

In various embodiments of the above example, the method further comprises: displaying a first virtual animation corresponding to the performed trick on a display of the first computing device; the method further comprises: communicating the determination to a second computing device, and displaying a second virtual animation corresponding to the performed trick on a display of the second computing device; the method further comprises: displaying a game animation on a display of the first computing device, and altering the displayed game animation based on the performed trick; the method further comprises: receiving, at the server, a parameter related to movement of a second rotatable device, the parameter being transmitted from a second computing device wirelessly connected to the second rotatable device, determining, at the server, a trick performed with the second rotatable device based on the parameter received from the second computing device, scoring, at the server, the trick performed with the first rotatable device, scoring, at the server, the trick performed with the second rotatable device, and transmitting the scores of the tricks performed with the first and second rotatable devices to the first and second computing devices; the method further comprises: storing received parameters and corresponding determined performed tricks for each of a plurality of rotatable devices, the plurality of rotatable devices including the first rotatable device; the method further comprises: storing account information correspond to a plurality of players, and associating each of the plurality of rotatable devices with the account information corresponding to one of the plurality of players; the method further comprises: determining, at the server, a skill level of a player based on stored received parameters and corresponding determined tricks for each rotatable device associated with the account information of the player, scoring, at the server, a determined trick performed with a rotatable device associated with the account information of the player, based on the determined skill level, and transmitting the score only to computing devices of players having a same skill level; and/or the method comprises: receiving, at the server, parameter information from the first computing device, the parameter information corresponding to a trick and being input by a player into the first computing device, wherein determining the trick performed with the first rotatable device is further based on the received parameter information.

DETAILED DESCRIPTION OF THE DRAWING

Considering the above, the present disclosure relates to "smart" yo-yos and similar rotatable devices, and a corresponding "connected" computing device (e.g., a computer or cell phone, having a processor, memory, display, and the like), which together are able to detect movement and tricks, and facilitate virtual entertainment of the rotatable device. For example, the system described herein can allow a player to perform, and also watch other players perform, at the same time when the players are in different locations. This may be accomplished, for example, with the system architecture illustrated in FIG. 2.

Figure 2:
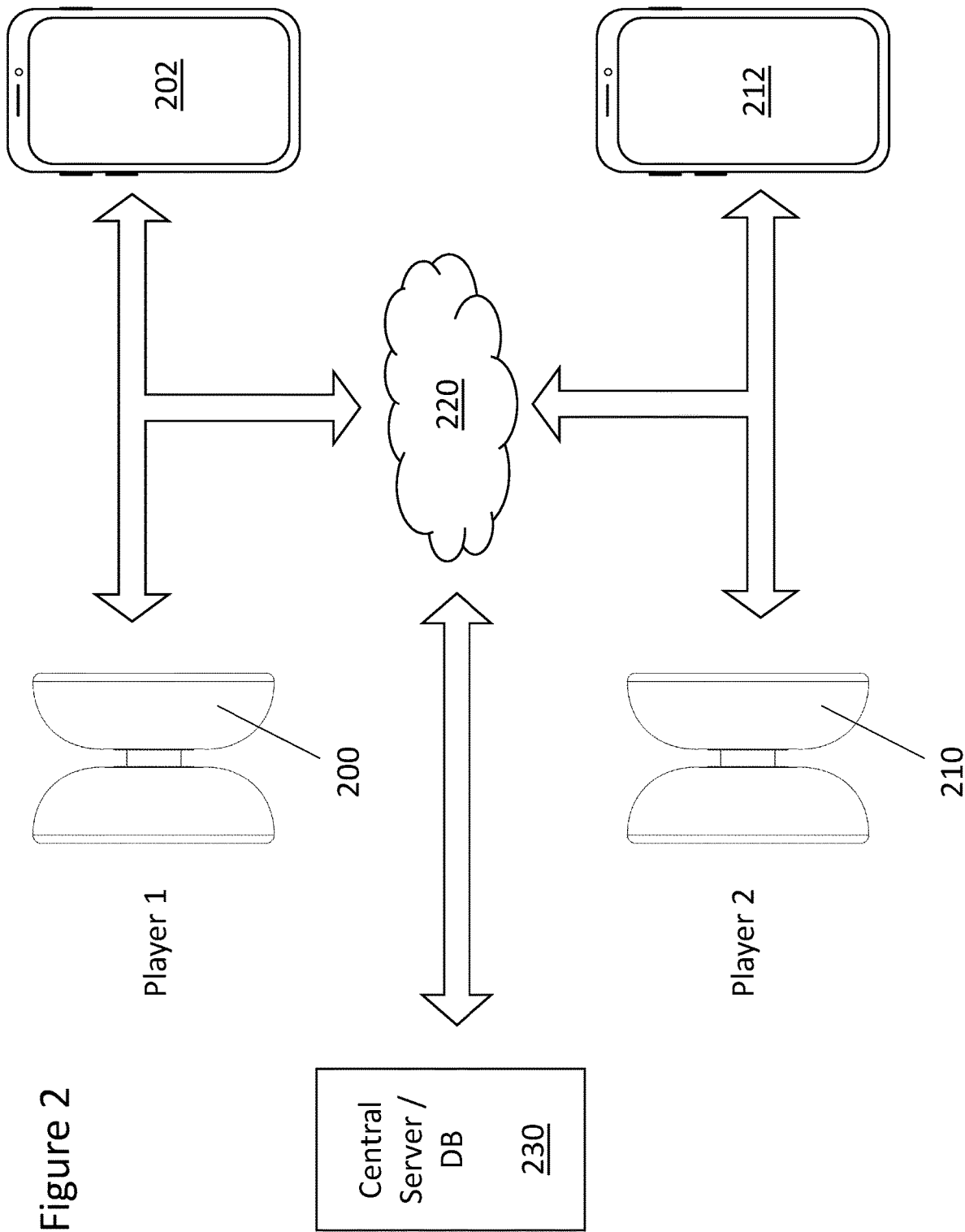
FIG. 2 illustrates an example system architecture of the present disclosure.

According to the example of FIG. 2, each player has their own yo-yo (or like rotatable device) 200, 210 and associated computing device 202, 212. Although FIG. 2 illustrates two players, the present disclosure is not so-limited, and can thus include any number of players. Further, although the following description references yo-yos, it is understood that the present disclosure is not so-limited, and can thus apply to any rotatable device. Each player's computing device 202, 212 may be a personal cell phone, tablet, computer, or the like, running an app or like software on any platform (e.g., ANDROID, IOS, WINDOWS, and the like). The computing devices 202, 212 are connected to the corresponding yo-yos 200, 210, and to each other (the other players' computing devices). The connections between devices may be via a 'cloud' network 220 (e.g., a wireless communication network or the Internet) or a short-range and/or low-powered communication protocol (e.g., BLUETOOTH (and BLUETOOTH LOW ENERGY (BLE)), Near Field Communication, RFID, and the like). For example, each yo-yo 200, 210 may be connected to the corresponding computing device 202, 212 via BLUETOOTH (or BLE), and each computing device 202, 212 may be connected to each other via the Internet.

The system may also include one or more central servers and/or databases 230 to which each player's computing device 202, 212 and/or yo-yo 200, 210 is connected via the network 220. The central server 230 may facilitate communication between the players' computing devices 202, 212 and/or yo-yo 200, 210, and facilitate processing of data collected by the computing devices 202, 212 and/or captured by the yo-yo 200, 210.

According to this architecture, data captured by the yo-yos 200, 210 about their movement and position can be shared amongst all devices and players. For example, the yo-yo 200 of Player 1 may capture movement data (e.g., rotations per minute) during its use and transmit that data to Player 1's computing device 202 via BLUETOOTH (or BLE). Player 1's computing device 202 may then process some or all of the data, and/or transmit some or all of the data to the central server 230 via the Internet 220 for processing. In some embodiments, the yo-yos 200, 210 may also perform some processing of the captured movement data. Such processing may identify and/or score any movements and tricks of the yo-yo performed by Player 1 based on the detected movement data. The processed data may then be transmitted from the central server 230 or Player 1's computing device 202, to the computing device 212 of Player 2 for output (e.g., displays and/or sounds), so that Player 2 may be made aware of the activity of Player 1. The results of any data processing performed by the central server 230 may also be transmitted back to Player 1's computing device 202. Each computing device 202, 212 may then show displays corresponding to the detected movements and tricks. For example, detected movements and tricks by Player 1 can be virtually animated on the computing device 202, 212 of any player. In some embodiments, the processed data may also be used to control the computing device, for example, by controlling an input to play a game.

Although not shown, some players may also have a camera (e.g., as part of the computing device 202, 212) for capturing images and/or video of the yo-yo 200, 210 and/or the player. The images and/or videos from one player's camera can also be transmitted over the network 220 and viewed by other players and/or spectators on their computing devices.

Each yo-yo preferably comprises at least one sensor for detecting motion and at least one transmitter (or transceiver) for communicating with the associated computing device. In some embodiments, the sensor and/or transmitter may include a registered tag that uniquely identifies the yo-yo. Further, each player may have a registered account (e.g., as maintained at the central server 230) associated with their devices. In this way, each device may be registered to a particular player (or player account). When registered to a particular player, that player may have access to recorded data, usage history, and the like associated with that device via any computing device when that player is logged in to their account (e.g., via an app) on the computing device.

In some embodiments, registration may also be used to authenticate the yo-yos. For example, the registered tag may be compared to a database of known tags (e.g., as maintained at the central server 230) associated with authentically manufactured devices. If a player attempts to register an unauthentic device with their account, that device may be rejected from the system.

As suggested above, during operation, the sensor(s) measure movement information of the yo-yo and, via a transmitter, the yo-yo transmits the measured movement information to the corresponding connected computing device. The computing device can then further process the detected information for further communication to other player computing devices and/or the central server 230 via the network. The transmitter is preferably any type of low-powered transmitter. For example, the transmitter may utilize the BLUETOOTH (or BLE) communication protocol for communication with the computing device.

The sensor(s) may be a gyrometer, accelerometer, force/pressure sensor, positioning sensor (e.g., GPS), motion tracking sensor, timer, time of flight sensor, photoreflective sensor, magnetometers, and/or the like. The sensor(s) are preferably able to measure speed, revolutions per minute (RPM), rotational/angular and/or linear velocity and/or acceleration, length of movement, revolution time, time in a "sleeping" state, number of turns, angle of turns, a number of contact points with the string, and like dynamics indicative of a skill of a player and/or a trick performed with the yo-yo. In some embodiments, the sensor may be an array of the same or different sensors. For example, the sensor may comprise a multi-axis accelerometer (e.g., having a plurality of individual accelerometers arranged to measure six degrees of movement including three degrees of rotation and 3 degrees of linear movement).

Once transmitted from the yo-yo to the corresponding computing device, the measurements may be further processed to, for example, identify a velocity of a throw along the length of the string, a length of throw, rotational/angular and/or linear acceleration/deceleration and/or velocity during a period of time, number of turns of the yo-yo at different angles (e.g., a number of turns of more than 90 degrees, of more than 180 degrees, and more than 360 degrees), a number of times the device is fully extended, a number of times the yo-yo the axle touches the string while spinning, and the like. Some parameter determinations may also be based on measurements from more than one sensor. For example, a combination of measurements from a rotational sensor and an accelerometer could be used to determine relative motion in space (e.g., to determine whether the device is moving up or down, or whether it is merely "sleeping" where both actions have similar rotational speeds). The location on a string and direction of movement on the string may be determined based on measured RPMs and/or a measurement(s) of the time of flight sensor.

Any sensors used to detect RPM, should be able to detect at least 2,500 RPM, and more preferably be able to detect at least 8,000 RPM. Any sensors used to collect acceleration data should preferably be able to detect at least 4 Gs of force. Any sensors used to collect angular velocity should be able to detect at least 2,000 degrees/second.

Figure 1:
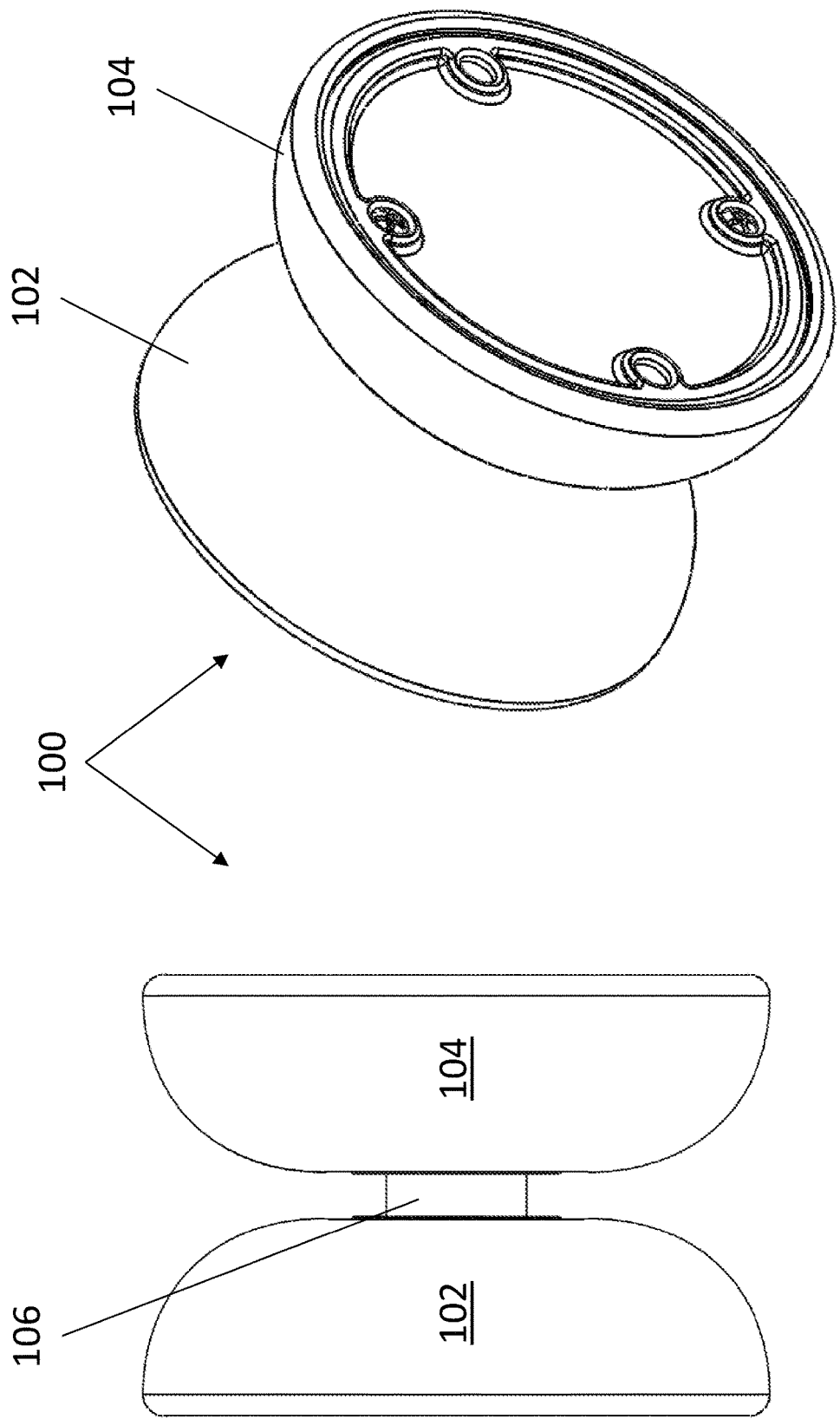
FIG. 1 illustrates front and perspective views an example yo-yo.
Figure 3:
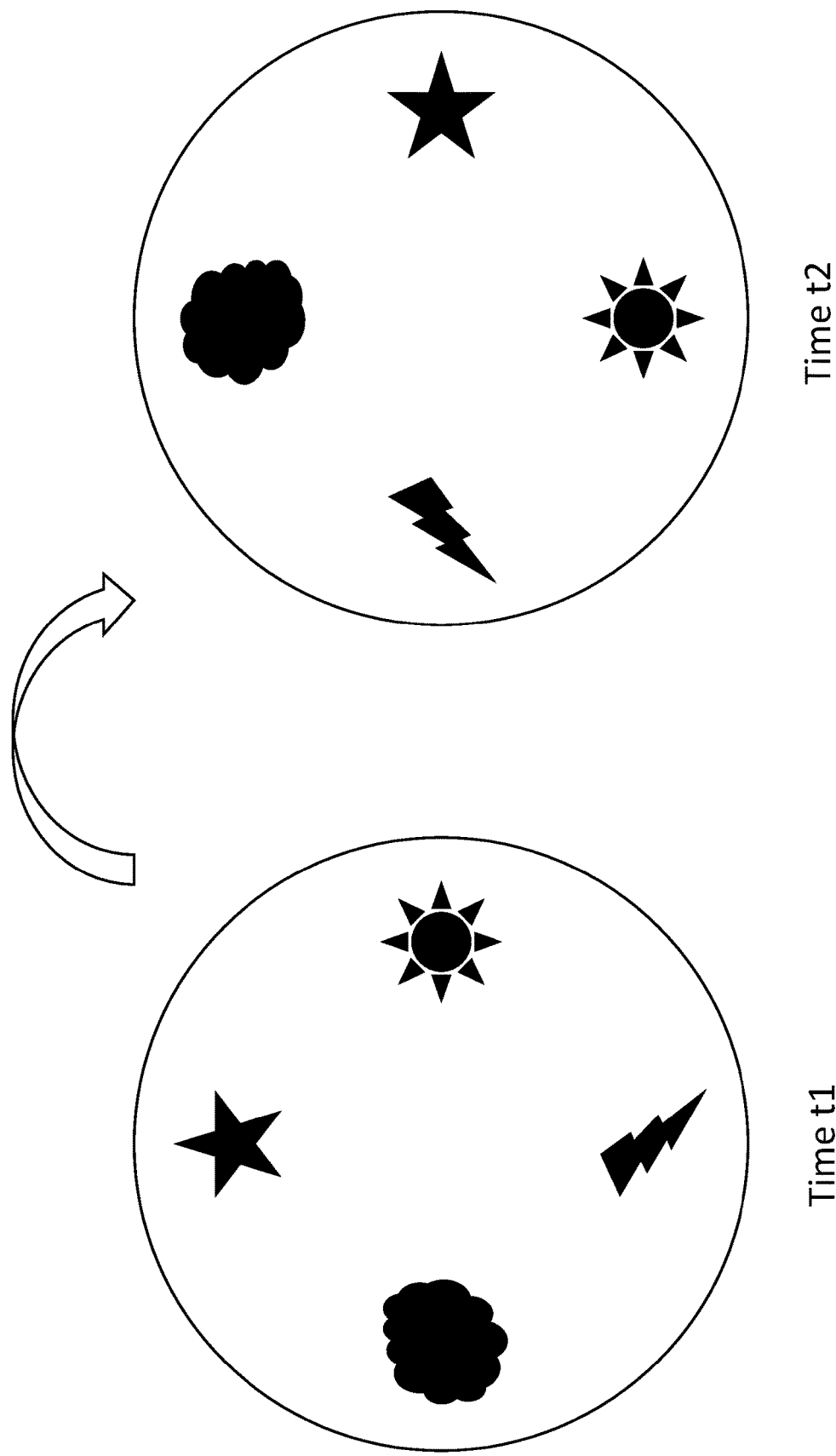
FIG. 3 illustrates an example operation of a motion tracking sensor.

For some embodiments, the motion tracker may include one or more visually trackable points, whose positions may be detected by a camera on the computing device. For example, as seen in FIG. 3 (illustrating side views/faces of one shell of the yo-yo 100 of FIG. 1), distinct visual elements are located on an exterior surface of the body. By comparing the relative positions of these elements as detected by a camera, and their positions over time, six degrees of movement of the device can be tracked. For example, comparing the relative locations of the star in FIG. 3 between times t1 and t2 can indicate that the device has rotated 90 degrees.

The photoreflective sensor may be used to determine the RPMs of the yo-yo by detecting each time the string on which the yo-yo rotates passes through the sensor. In one example, the photoelectric sensor may include a light emitter and a photodetector. The light emitter and photodetector may be contained in a single module, or may be separate (e.g., in different shells of the yo-yo). The light emitter emits a light that is detected by the photodetector, either directly when the light emitter and photodetector are located across from each other in opposite shells, or as a reflection of the light from the opposing shell when the light emitter and the photodetector are in the same module. The emitted light may be transmissible through the shell itself, or the shell may include windows at positions corresponding to the light emitter and the photodetector. As the yo-yo rotates around the end of the string, the string passes through the path of the light, thereby interrupting detection of the light by the photodetector. Each interruption of light corresponds to one revolution of the yo-yo. In order to minimize the noise effects of ambient light on the photodetector, the photoelectric sensor may be located as close to the axle as possible.

The time of flight sensor may similarly utilize a light emitter and photodetector, however, the light emitted by the light emitter of the time of flight sensor is preferably reflected from the ground (or like stationary object) and then detected by the photodetector. The distance between the ground (or like stationary object) and the yo-yo can then be determined based on the time between the emission of light and detection of light, given the known speed of light travel. Accordingly, the time of flight sensor makes it possible to determine a spatial position and spatial movement of the yo-yo (e.g., traveling up or down the string, or sleeping at a determined height). In order to ensure the emitted light is directed toward the ground, the light emitter may be controlled based on an output of the accelerometers, gyrometers, or like sensors. In other words, the outputs of such sensors may be processed (either at the yo-yo or the corresponding computing device) to determine the relative rotational orientation of the yo-yo. When it is determined that the rotational orientation of the yo-yo is such that the light emitter is facing the ground, the light emitter may be controlled to emit a pulse of light. In some embodiments, the time of flight sensor may be integrated with the photoreflective sensor. As with the photoreflective sensor, the shell may allow the light to pass therethrough, or windows may be provided in the shell.

A magnetometer may be used to determine a position of the yo-yo based on the strength of a magnetic field at the yo-yo. In one example embodiment, a magnetic device may be on worn on a player's hand. Because the strength of the corresponding field detected by the magnetometer in the yo-yo is a function of distance and orientation between the magnetometer and the magnetic device, the corresponding magnetic field signals from the magnetometer could be used to determine a position of the yo-yo relative to the player's hand (or the location of the magnetic device). Still further, the magnetometer may be configured to collect information in multiple axes/dimensions. Accordingly, the magnetometer can provide attitude information about the yo-yo. And because the magnetometer information is relative to the location of the magnetic device, movement of the magnetic device may also be derived, given known movements of the yo-yo. For example, accelerometers may be used to determine that the yo-yo is 'sleeping.' Therefore, any movements detected by the magnetometer would correspond to movement of the player's hand (or other location of the magnetic device). Determining such movement of the magnetic device may be beneficial for detecting tricks that require particular hand movements. In other embodiments a magnetometer may detect ambient magnetic fields rather than a magnetic device worn by a player. Although the ambient fields may be unknown, relative changes detected by the magnetometer may still be used to identify relative attitude information, and changes thereof.

A weight of the sensor(s), transmitter, and other elements of the system is preferably evenly distributed in three dimensions across the yo-yo. For example, the sensor(s) and transmitter may be evenly distributed by weight across both shells of the yo-yo, or additional weight may be added to one shell of the yo-yo. Preferably the weight is also distributed angularly around the axle. By evenly distributing the weight, the yo-yo remains balanced and can be properly rotated.

Figure 4:
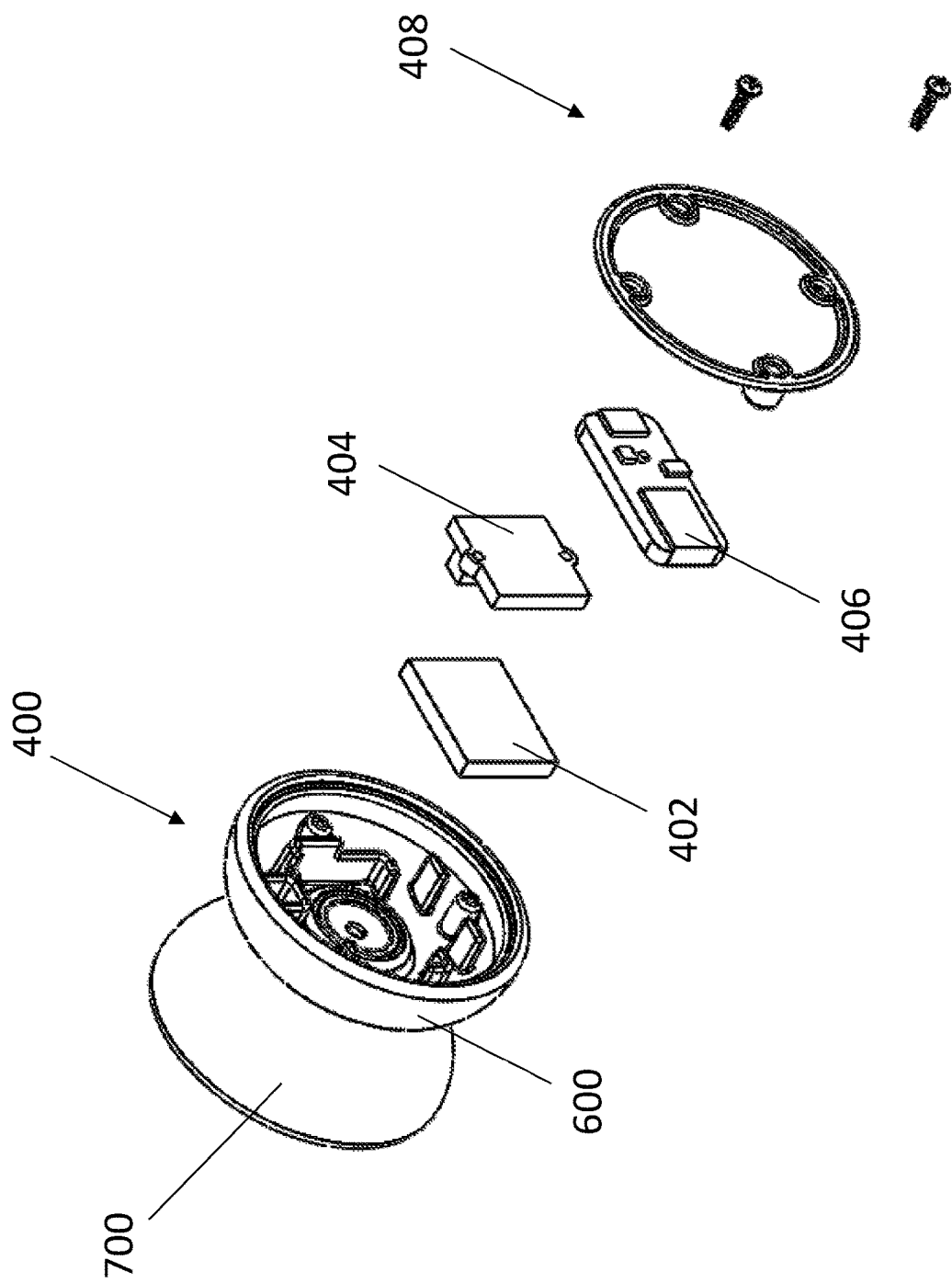
FIG. 4 illustrates an example yo-yo having an exploded view of the elements contained therein.

An example structure of a yo-yo is illustrated in FIGS. 4-7. FIG. 4 illustrates an example yo-yo 400 having an exploded view of the elements contained in its shell 600. As seen in FIG. 4, all of the elements are included in only one shell of the device. Particularly, the shell houses a power source (such as a coin cell battery) 402, photoreflective sensor 404, and motherboard 406. Depending on the sensor (s) and transmitter used, the power source 402 may be a coin cell, thin-film, lithium-ion, or like battery. In some embodiments, the battery may be rechargeable, for example, by the motion of the yo-yo itself. In some embodiments, power may be supplied passively powered by communication with the computing device, thereby removing the need for an integrated power source 402. The battery may be controlled by the motherboard to only supply power when powered sensors are used and during times of communication, thereby conserving the life of the battery.

The motherboard may be, for example, a printed circuit board having a transceiver (e.g., BLUETOOTH or BLE communication module), multi-axis accelerometer array, DC/DC converter (for converting power levels supplied by the power source 402 to those needed for powering the other elements), USB connector, processor, memory, and the like mounted thereon or imbedded as one or more integrated circuits mounted thereon. The memory may store data collected by the sensors and/or processed by the processor prior to (or after) transmission to the connected computing device. For example, data may be transmitted from the yo-yo to the connected computing device only periodically (e.g., after a performance, series of tricks, or predetermined period of time) to limit power consumption and increase battery life. Accordingly, sensor data may be stored in the memory between each transmission. To the extent any or all of the processing of the data is performed by the processor of the yo-yo, that processed data may also be stored in the memory of the yo-yo. The USB connector may be used to collect information stored in the memory, service the yo-yo (e.g., upgrade firmware of the processor or the like), charge the battery, and the like.

Further, a side cap (secured by screws, or having a snap-fit) 408 covers the shell. The cap may be removable to obtain access to the elements housed within the shell for maintenance, for example, to change a battery therein. Of course other sensors may alternatively or additionally be included in the shell, either as distinct elements (as with the photoreflective sensor 404) or mounted on the motherboard 408 (as with the multi-axis accelerometer array).

Figure 5:
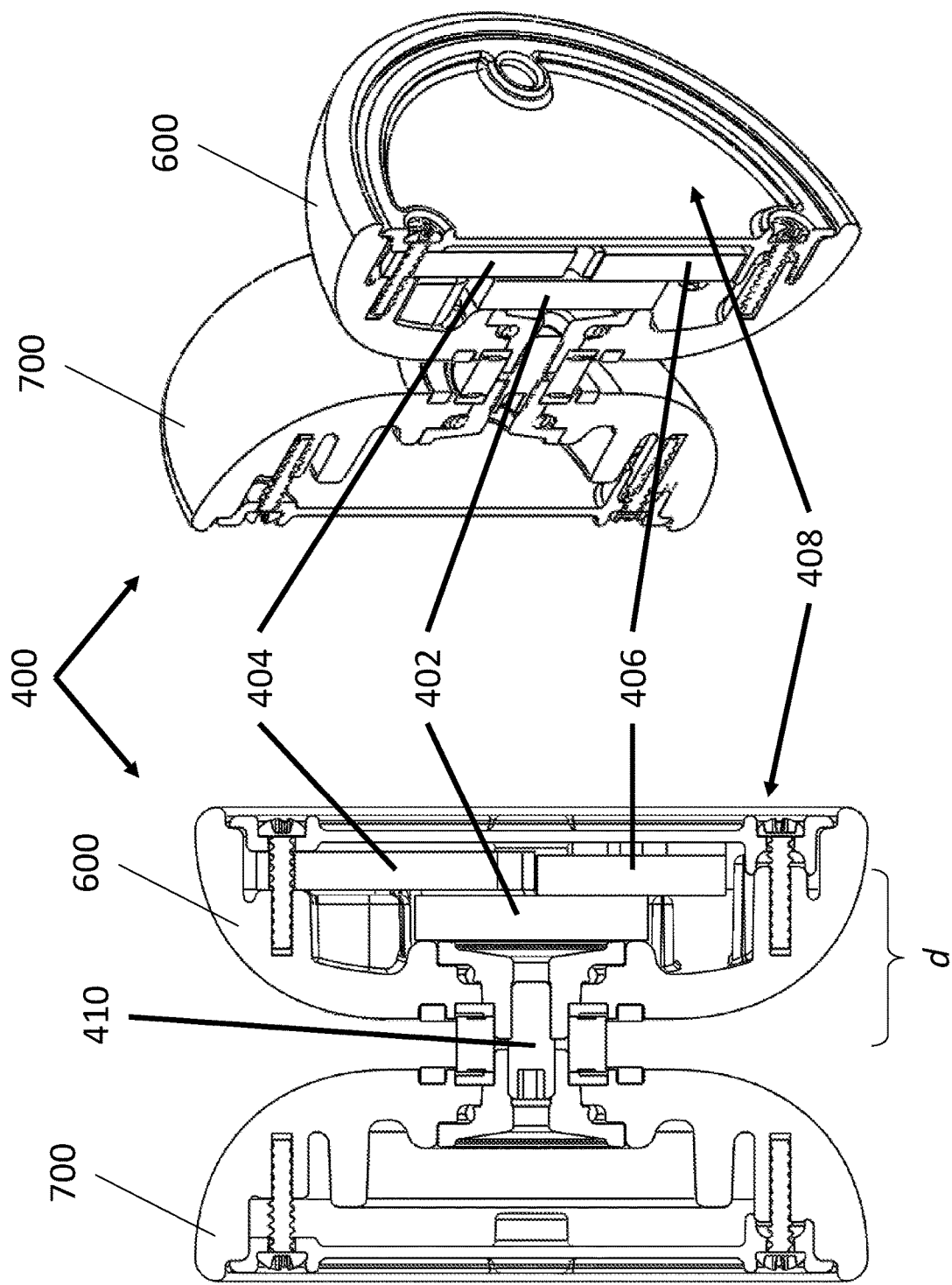
FIG. 5 illustrates cross-sectional views of the example yo-yo of FIG. 4.

FIG. 5 illustrates cross-sectional views of the shell 600 of the yo-yo 400 that houses the above-discussed elements. As seen therein, the power source 402, photoreflective sensor 404, and motherboard 406 are generally arranged symmetrically about the axle 410. In other words, the weight of the elements housed in the shell 600 is as constant as possible for any given radius from the axle 410. In the particular example of FIG. 5, the power source 402 is located such that its center of mass is as close as possible to a point on an axis that extends through the center of the axle 410 of the yo-yo 400. Accordingly, the power source 402 is rotationally balanced about the axle 410. Similarly, although the centers of mass of the photoreflective sensor 404 and motherboard 406 are offset from the center of the axle 410, their combined center of mass is preferably as close as possible to a point on the axis that extends through the center a of the axle 410 of the yo-yo 400. Accordingly, because the photoreflective sensor 404 and motherboard 406 are at the same distance d from a center of the yo-yo, their total weight remains as evenly distributed as possible about the axle 410.

Figure 6:
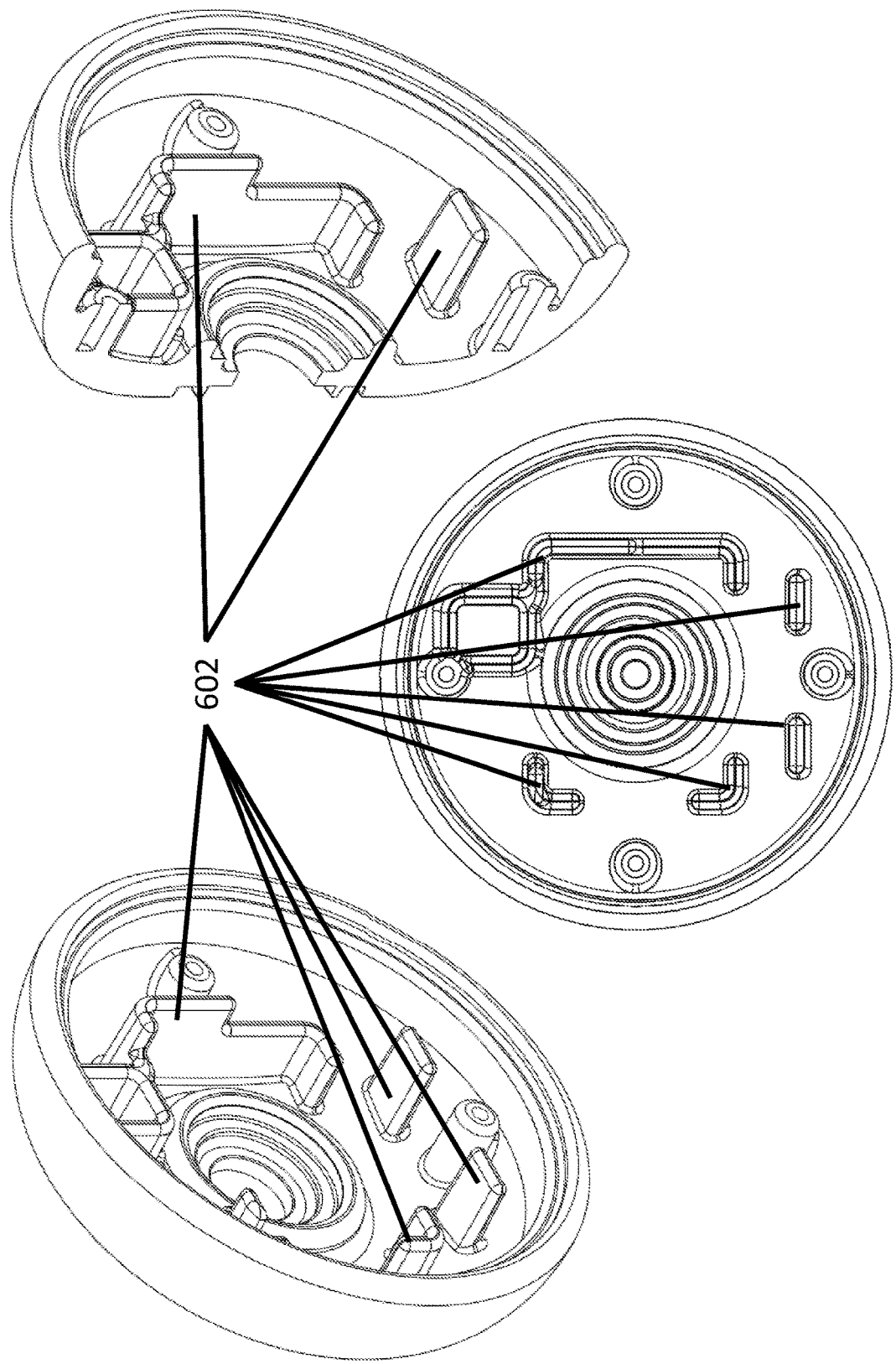
FIG. 6 illustrates a first shell of the example yo-yo of FIG. 4.

As shown in FIG. 6, the power source 402, photoreflective sensor 404, motherboard 406, and any other elements housed within the shell may be supported by and/or mounted to projections 602 in the shell 600. These projections may be integral with the shell itself, for example, as part of a mold used to manufacture the shell. The weight of these projections may also be considered when determining the total weight distribution of the elements housed inside the shell.

Figure 7:
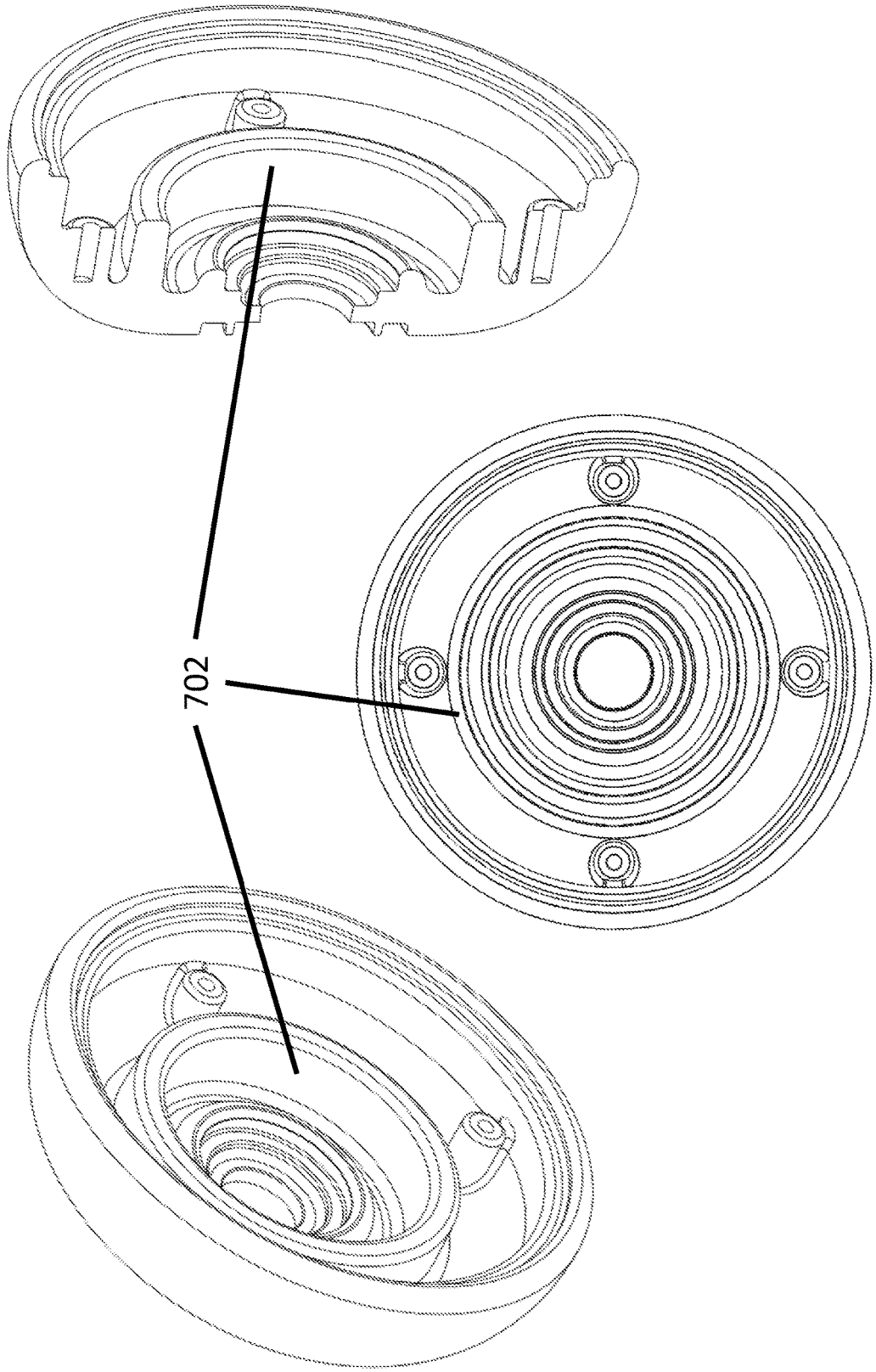
FIG. 7 illustrates a second shell of the example yo-yo of FIG. 4.

FIG. 7 illustrates cross-sectional views of the shell 700 of the yo-yo 400 that does not house the above-discussed elements. Because the shell 700 of FIG. 7 does not include the power source 402, photoreflective sensor 404, motherboard 406, projections 600, or other elements, the shell 700 includes a protruding ring 702 therein to counter-balance the elements of the other shell 600 in FIG. 6. Accordingly, the ring 702 preferably has a uniform density and is co-axial with the axle 410 of the yo-yo 400 so that it is rotationally balanced about the axle 410; and the ring 700 also preferably has a mass equal to that of the elements in the other shell so that the total mass of each shell (and the elements therein) is equal. As with the projections 602, the ring 702 may be integral with the rest of the shell 700.

Referring again to FIG. 2, with the above-noted information from the sensors of the yo-yo 200, 210, different tricks performed by the player may be identified and/or scored automatically by the associated computing device 202, 212 and/or server 230. For example, dynamic properties associated with each one of a plurality of predefined tricks may be stored in a database accessible by each computing device 202, 212 and/or server. For example, the database may be stored remotely at the server 230. Tricks may then be identified by comparing measurements at instantaneous points in time, and over predefined time periods, to the measurements associated with each trick stored in the database 230. Further, by comparing time points when tricks are identified, the time to transition between tricks can be determined.

In some embodiments, a player may introduce and record a new trick into the database 230. For example, a player may enter the parameters defining the trick into the computing device 202, 212; and once performed for confirmation (the measured parameters matching the entered parameters), the trick may be stored in the database 230. In variations of this embodiment, if a trick is performed and no comparable trick is found in the database 230, the computing device 202, 212 may prompt the player to identify whether the trick is new and should be stored in the database.

Similarly, different quantitative levels of some or all of the parameters may be used to score each player's movements and tricks. For example, a low score level may be associated with a yo-yo measured to spin at less than 1,500 RPM, a medium score level may be associated with spinning between 1,500-3,000 RPM, and a high score may be associated with spinning at or above 3,000 RPM. Composite scores may also be given by weighting scores and/or quantifying levels associated with some or all of the measured parameters, and/or by calculating a score for a series of tricks.

The server 230 may also be configured to implement a machine learning system trained to receive measurements from the sensors of the yo-yo 200, 210, and to output a trick and/or score. Such a machine learning system may be trained with training data including measured parameters from the sensors of a yo-yo, and known corresponding tricks performed by the yo-yo while the measurements were taken. The machine learning system may also be further continually trained. For example, continual training may be based on new measurements received from each yo-yo 200, 210, and indications from players themselves indicating whether the trick and/or score was properly identified by the machine learning system.

When a recognized trick has been performed and/or a desired score has been achieved, the computing device can play an audible sound, a visual animation, or the like. For example, a bell or chime may sound to alert the player that they have successfully completed a trick, or reward the player for completing the trick. Similarly, an animated fireworks display may be shown on the computing device to alert or reward the player for completion of the trick. When a player performs difficult tricks and/or achieves a predetermined score level, they may be given a badge or the like to indicate their skill level.

In some embodiments, an animation of the completed trick itself may be played by the computing devices 202, 212. For example, each player account may be associated with one or more avatars representing the player, as well as a model of their yo-yo 200, 210. Following completion of a trick, a computing device 202, 212 may show an animation of the player's avatar completing the same trick with the modeled yo-yo.

Any of the above outputs (displays and sounds) may be shown on the computing device 202, 212 corresponding to the yo-yo 200, 210 on which the trick was performed, and/or any other player's computing device 202, 212. For example, the animation corresponding to a trick performed on the yo-yo 200 of Player 1 may be shown on the computing devices 202, 212 of both Players 1 and 2. Different outputs may also be provided on each computing device 202, 212. For example, the computing device 202 of Player 1 may display animated fireworks celebrating the completion of a trick, while the computing device 212 of Player 2 may display a virtual animation of the Player 1's avatar completing the trick or an actually recorded video of Player 1 completing the trick. The outputs may also be provided by the central server 230 (or a computing device not connected to an individual yo-yo), such that the outputs may be broadcast to spectators or others that do not have their own yo-yo 200, 210 and/or computing device 202, 212. For example, spectators may view the displays on their own computing devices 202, 212 remote from each player, or in a central location (e.g., the site of a competition).

A history of each player's tricks may be stored locally at the player's computing device or yo-yo, or remotely at a central server (e.g., where the aforementioned database is stored). In some embodiments, historical information may additionally or alternatively be stored at the yo-yo 200, 210 itself in onboard memory. Accordingly, a player may track their historical progress, for example, to identify areas for improvement and assist in training. This information may also be used to determine a player's skill. For example, a skill level may be determined by comparing the history of a player's tricks. More recent tricks may be given more weight in determining the skill level.

In some embodiments, the computing device may facilitate training programs for each player. For example, a player may input their initial skill level and a desired skill level to the computing device. Based on these inputs, the computing device may recommend goals as different tricks and/or different score levels to achieve that will improve the player's skill. The player may also complete an initial assessment (e.g., a series of increasingly difficult tricks). The computing device may analyze which tricks the player was able to complete, and at which score level, to identify the player's initial skill level. The computing device may then begin a training program with different tricks and/or score levels to improve the player's skill based on the identified initial skill.

Further, different players may 'connect' with each other, and view each other's completed tricks including any animations associated with the tricks, any badges awarded to the player, and their recognized skill level. These connections may form communities between players, for example, based on skill level, friendship, device type, geographic regions, schools, other predefined groups (e.g., those associated with clubs separate from the device and system described herein), and the like. Connected players (e.g., Player 1 and Player 2) may also watch each other perform tricks in real-time, or almost real-time, or watch previously performed tricks. When watching other players, video may be captured of the player performing the tricks by a camera (with or without audio) connected to that player's computing device 202, 212, and then streamed to the other watching players and/or stored for later viewing (either locally or remotely). Alternatively or in addition to, the animations of that player's avatar performing the tricks may be viewed by the watching players. These connections may also be facilitated through third party social networking and social media platforms. For example, players may share tricks, videos, and the like directly to another social media platform (e.g., FACEBOOK or INSTAGRAM).

In some embodiments, connected computing devices 202, 212 and/or the central server 230 may facilitate competitions between different players. For example, judges may watch each player perform a series of tricks (either through actual video or animated avatars) within a predetermined time period, and assign corresponding scores. In other instances, the computing device 202, 212 and/or central server 230 may assign scores, as discussed above. Competitions may be divided by skill level, for example, as determined by the computing device 202, 212 and/or central server 230. Additionally, an 'all-around' competition can include all interested players, and some competitions may be limited to specially invited players. Additionally, or still in alternative embodiments, competitions may be conducted within any of the above-described player communities. In addition to competitions, leaderboards (e.g., showing top scores and tricks) across all players, or within given player communities, may also be maintained by a central database 230, and viewable by connected players.

In some embodiments, the scores (and/or leaderboard), visual animations corresponding to tricks, and the like may be displayed on a central display (e.g., a projector) at the competition location. The central display may be controlled directly by (or be part of) the central server 230, be connected to the central server 230, and/or connected individually to each of the computing devices 202, 212. In this manner, displays associated with competition and yo-yo performance can be shown to a crowd rather than the players individually on their own computing devices 202, 212. Similarly, each spectator in a crowd may view such a competition on their own computing device. For example, the spectator may watch the competition remotely on a personal laptop or cell phone by connecting to the central server 230. Such remote spectators could view the same outputs (e.g., visual animations, sounds, camera videos/images) as the players and spectators at the competition.

In addition to competitions, players can also take part in multiplayer or single player games via the computing device 202, 212 and/or central server 230. In some instances these games may be competitive. For example, single player games may include a "trick roulette" where a player has to complete a randomly selected trick(s) in order to advance. Other games may be based on speed challenges, for example scoring players on their time to complete a predetermined number of tricks or scoring players based on the number and/or difficulty of tricks completed in a predetermined time period. Multiplayer games may be based on concepts similar to "HORSE" in basketball, where each player challenges another to complete a trick. Other games may score a player based on their ability to perform tricks within a musical or visual rhythm presented to the player by the computing device. Still other games may be action/adventure oriented. For example, these games may require a player to perform a trick in order to shoot a laser at an oncoming enemy, where the game is visualized on the computing device. In some embodiments, hitting a particular enemy may require performing a predetermined trick and/or performing the trick in a predetermined direction (e.g., towards the enemy as seen in the perspective displayed on the computing device), where the direction of the trick is detected by the sensors of the device.

In addition, the yo-yo may comprise one or more actuators such as a motor, clutch, lights, speaker, or the like that is controllable by the computing device 202, 212. Preferably, the actuator(s) is embedded in the yo-yo with an even weight distribution, as described above with respect to the power source 402, photoreflective sensor 404, and motherboard 406. In this way, the player may input a desired action (e.g., a rotation speed) to the computing device 202, 212. The computing device 202, 212 may than transmit a signal to a receiver (or transceiver) of the yo-yo, which can be processed and used to command the actuator to perform the desired action. Such actions by the yo-yo that are controlled by the computing device 202, 212 may be used, for example, to help a player train or complete a trick. The actuators may also provide a reward for completing a trick, for example, by causing the yo-yo to light up and/or make a sound.

Each player may also have access to an e-store via the computing device 202, 212 and their player account. In the e-commerce portal, players may purchase devices and accessories, access keys to unlock restricted games (or game levels/features) or like activities, animations and/or customized visualizations for the player's avatar and/or animated device (e.g., 'skins'), and/or like features of an app, and/or unique devices. In some cases, these purchases may only be available through the computing device 202, 212 (via the app), and would not otherwise be available to the general public. A player may also be rewarded with money to use in the e-store by achieving certain skill levels (e.g., performing a given trick, reaching a given score level, completing given games, winning competitions, and the like). Coupons or certificates for tangible purchases (e.g., a new yo-yo, a modification or upgrade for a device, or the like) may also be provided to a player.

The above-described features are not intended to be limiting, and may be combined in any manner. For example, depending on the embodiment, the above-discussed data from sensors and processed data may be stored at any or all of the yo-yo, computing device, and remote server/database. Similarly, the above-discussed outputs may be provided on any or all connected computing devices. Further, the present disclosure is not intended to be limited to only the rotatable devices expressly mentioned. Rather, the features described above may be applicable to any toy with which tricks may be performed.

What is claimed is:

1. A method, comprising:
   displaying a first visualization on a first computing device, the first visualization showing a first virtual trick faced by a virtual character;
   receiving a parameter related to movement of a first rotatable device, the parameter being measured by at least one sensor in the first rotatable device and transmitted by a transmitter in the first rotatable device;
   determining a trick performed by a user of the rotatable device based on the received measured parameter; and
   displaying a second visualization on the first computing device, the second visualization showing a second virtual trick faced by the virtual character,
   wherein the determined trick constitutes an input to the first computing device that controls the virtual character in a manner that causes the virtual character to pass from the first visualization to the second visualization, and
   wherein the first rotatable device is a yo-yo, a diabolo, a frisbee, a top, or a dreidel.

2. The method of claim 1, further comprising:
   displaying a first trick animation corresponding to the performed trick on the first computing device.

3. The method of claim 2, further comprising:
   communicating the determination to a second computing device, the second computing device being configured to display a second trick animation corresponding to the performed trick on a display of the second computing device.

4. The method of claim 1, further comprising:
   receiving a measured parameter related to movement of a second rotatable device;
   determining a trick performed by the second rotatable device based on the measured parameter of the second rotatable device;
   scoring the trick performed with the first rotatable device;
   scoring the trick performed with the second rotatable device; and
   transmitting the scores of the tricks performed with the first and second rotatable devices to the first and second computing devices.

5. The method of claim 1, wherein the first rotatable device is the yo-yo.

6. The method of claim 1, wherein the first rotatable device is configured to rotate around a predetermined axis.

7. The method of claim 1, wherein the first rotatable device is the diabolo.

8. The method of claim 1, wherein the first rotatable device is the top or the dreidel.

9. A rotatable device, comprising:
   two shells connected by an axle;
   at least one sensor configured to measure a parameter related to movement of the rotatable device; and
   a transmitter configured to transmit the measured parameter to a computing device,
   wherein the rotatable device is a diabolo or a yo-yo,
   wherein the at least one sensor and the transmitter are housed in a first of the two shells, and
   wherein the second shell comprises a protruding ring within the second shell that is coaxial with the axle.

10. The rotatable device of claim 9, wherein the at least one sensor comprises a time of flight sensor.

11. The rotatable device of claim 9, wherein the at least one sensor comprises a magnetometer.

12. A method, comprising:
    displaying a first visualization on a first computing device, the first visualization prompting a user to perform a first trick with a first rotatable device;
    receiving a parameter related to movement of the first rotatable device, the parameter being measured by at least one sensor in the first rotatable device and transmitted by a transmitter in the first rotatable device;
    determining whether the first prompted trick was performed by the user of the first rotatable device based on the received measured parameter; and
    displaying a second visualization on the first computing device based on whether the first prompted trick was performed, the second visualization prompting the user to perform a second successive trick with the first rotatable device, wherein the first and second visualizations constitute sequential elements of an animation whose advancement is determined based on whether prompted tricks are performed, and wherein the first rotatable device is a yo-yo, a diabolo, a frisbee, a top, or a dreidel.

13. The method of claim 12, further comprising:

displaying a first animation corresponding to the performed trick on the first computing device.

14. The method of claim 13, further comprising:

communicating the determination of the performed trick to a second computing device; and displaying a second animation corresponding to the performed trick on the second computing device.

15. The method of claim 12, further comprising:

receiving a parameter related to movement of a second rotatable device;

determining a trick performed with the second rotatable device based on the received parameter;

scoring the trick performed with the first rotatable device;

scoring the trick performed with the second rotatable device; and transmitting the scores of the tricks performed with the first and second rotatable devices to the first computing device and to a second computing device associated with the second rotatable device.

16. The method of claim 12, further comprising:

storing received parameters and corresponding determined performed tricks for each of a plurality of rotatable devices, the plurality of rotatable devices including the first rotatable device;

storing account information corresponding to a plurality of users; and associating each of the plurality of rotatable devices with the account information corresponding to one of the plurality of users.

17. The method of claim 16, wherein a skill level of the user of the first rotatable device is determined based on the stored received parameters and corresponding determined tricks for each rotatable device associated with the account information of the user of the first rotatable device.

18. The method of claim 17, further comprising:

transmitting a score of the determined trick to a plurality of computing devices, wherein the plurality of computing devices are associated only with users having a same skill level as the user of the first rotatable device.

19. The method of claim 12, further comprising:

receiving parameter information corresponding to a trick that is input by the user into the first computing device, wherein determining the trick performed with the first rotatable device is further based on the received parameter information.

20. The method of claim 12, wherein the first rotatable device is configured to rotate around a predetermined axis.

21. The method of claim 12, wherein the first rotatable device is the yo-yo.

22. The method of claim 12, wherein the first rotatable device is the diabolo.

23. The method of claim 12, wherein the first rotatable device is the top or the dreidel.

* * * * *